(12) United States Patent
Park

(10) Patent No.: US 12,199,753 B2
(45) Date of Patent: Jan. 14, 2025

(54) APPARATUS AND METHOD FOR REUSING RESOURCES IN EXTENDED BANDWIDTH

(71) Applicant: SAMSUNG ELECTRONICS CO., LTD., Suwon-si (KR)

(72) Inventor: Jeongwoo Park, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/713,441

(22) Filed: Apr. 5, 2022

(65) Prior Publication Data

US 2022/0368452 A1 Nov. 17, 2022

(30) Foreign Application Priority Data

May 6, 2021 (KR) ......................... 10-2021-0058786

(51) Int. Cl.
| | | |
|---|---|---|
| *H04W 4/00* | (2018.01) | |
| *H04B 7/0426* | (2017.01) | |
| *H04L 1/00* | (2006.01) | |
| *H04L 1/06* | (2006.01) | |
| *H04L 5/00* | (2006.01) | |

(52) U.S. Cl.
CPC ......... *H04L 1/0006* (2013.01); *H04B 7/0426* (2013.01); *H04L 1/0025* (2013.01); *H04L 1/0064* (2013.01); *H04L 1/0606* (2013.01); *H04L 5/0044* (2013.01)

(58) Field of Classification Search
CPC ... H04L 1/0006; H04L 1/0025; H04L 1/0064; H04L 1/0606; H04L 5/0044; H04L 5/0023; H04L 1/0041; H04L 1/02; H04L 1/0631; H04B 7/0426; H04B 7/0413; H04W 72/0453
See application file for complete search history.

(56) References Cited

U.S. PATENT DOCUMENTS

| | | | |
|---|---|---|---|
| 7,711,060 B1 * | 5/2010 | Lou ...................... | H04L 1/0071 375/267 |
| 7,978,759 B1 * | 7/2011 | Sarrigeorgidis .. | H04L 25/03159 708/320 |
| 8,233,571 B2 | 7/2012 | Mukai et al. | |
| 9,397,707 B2 | 7/2016 | Kang et al. | |
| 9,917,933 B2 | 3/2018 | Seok | |
| 10,056,949 B2 | 8/2018 | Van Zelst et al. | |
| 10,327,246 B2 | 6/2019 | Seok | |
| 2002/0171501 A1 * | 11/2002 | Noguchi ............... | H04L 1/0083 332/112 |

(Continued)

FOREIGN PATENT DOCUMENTS

| | | |
|---|---|---|
| KR | 10-1551919 B1 | 9/2015 |
| KR | 10-2016-0008453 A | 1/2016 |

*Primary Examiner* — Atique Ahmed
(74) *Attorney, Agent, or Firm* — Fish & Richardson P.C.

(57) ABSTRACT

Processing circuitry, which is configured to process a wireless signal received through at least one antenna, includes: at least one segment deparser configured to generate a data stream from segments respectively corresponding to different frequency bands; at least one rearranger configured to rearrange the data stream to generate a rearranged data stream; and a stream deparser configured to generate a bitstream based on the data stream or the rearranged data stream according to a reception mode, the reception mode being defined based on a bandwidth and multiple-input and multiple-output (MIMO) used for transmission of the wireless signal.

17 Claims, 13 Drawing Sheets

(56) References Cited

U.S. PATENT DOCUMENTS

| | | | |
|---|---|---|---|
| 2003/0196159 A1* | 10/2003 | Kondo | H04N 19/88 |
| | | | 348/E5.077 |
| 2005/0053169 A1* | 3/2005 | Jia | H04B 7/0417 |
| | | | 375/267 |
| 2005/0169320 A1* | 8/2005 | Hosokubo | H04B 14/04 |
| | | | 370/522 |
| 2007/0157262 A1* | 7/2007 | Ramaswamy | H04N 21/25866 |
| | | | 725/86 |
| 2011/0290878 A1* | 12/2011 | Sun | G06K 7/1473 |
| | | | 235/462.07 |
| 2012/0231740 A1* | 9/2012 | Bradley | G06F 21/445 |
| | | | 455/41.3 |
| 2012/0278591 A1* | 11/2012 | Hilker | G06F 9/30109 |
| | | | 712/E9.028 |
| 2014/0359394 A1* | 12/2014 | Gasanov | H03M 13/6325 |
| | | | 714/792 |
| 2016/0028439 A1* | 1/2016 | Tahir | H04B 3/54 |
| | | | 375/257 |
| 2016/0329929 A1* | 11/2016 | Kenney | H04L 5/0039 |
| 2016/0337672 A1 | 11/2016 | Lee et al. | |
| 2019/0150117 A1 | 5/2019 | Lou et al. | |
| 2020/0186275 A1* | 6/2020 | Ducoing | H04L 1/005 |
| 2020/0383133 A1 | 12/2020 | Hu et al. | |
| 2021/0243058 A1* | 8/2021 | Doan | H04L 27/3405 |
| 2021/0360472 A1* | 11/2021 | Cao | H04L 27/2605 |

\* cited by examiner

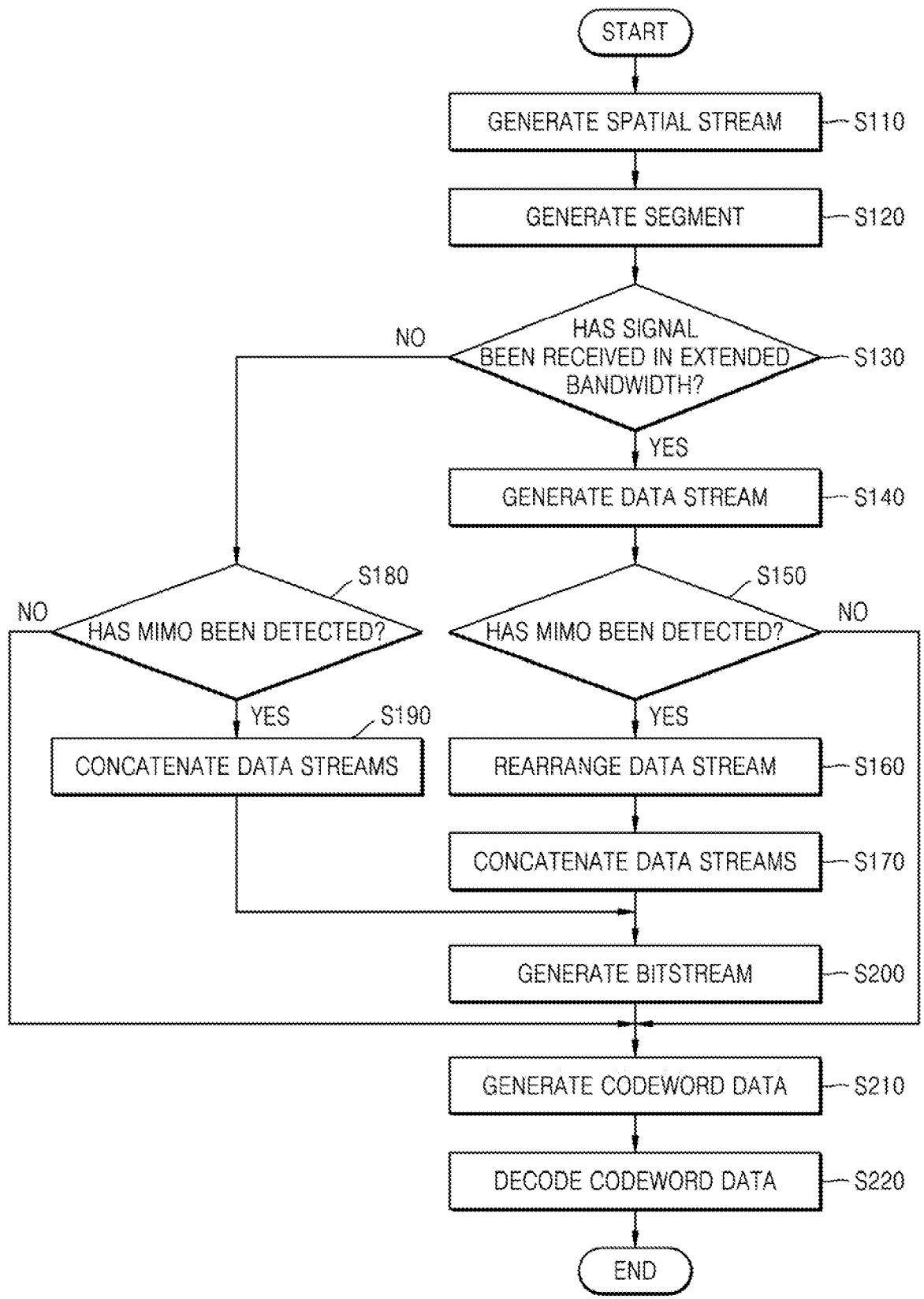

APPARATUS AND METHOD FOR REUSING RESOURCES IN EXTENDED BANDWIDTH

CROSS-REFERENCE TO RELATED APPLICATION

This application is based on and claims priority under 35 U.S.C. § 119 to Korean Patent Application No. 10-2021-0058786, filed on May 6, 2021, in the Korean Intellectual Property Office, the disclosure of which is incorporated by reference herein in its entirety.

BACKGROUND

1. Field

Embodiments relate to wireless communication, and particularly, to an apparatus and a method for reusing resources in an extended bandwidth.

2. Description of the Related Art

Wireless local area network (WLAN) technology is an example of wireless communication, and is a technology of connecting two or more devices to each other using wireless signal transmission. WLAN may be based on the Institute of Electrical and Electronics Engineers (IEEE) 802.11 standard. The 802.11 standard has evolved to 802.11b, 802.11a, 802.11g, 802.11n, 802.11ac, 802.11ax, and the like, and may support a transmission rate up to 1 Gbyte/s based on orthogonal frequency division multiplexing (OFDM) technology.

SUMMARY

Embodiments are directed to processing circuitry configured to process a wireless signal received through at least one antenna, the processing circuitry including: at least one segment deparser configured to generate a data stream from segments respectively corresponding to different frequency bands; at least one rearranger configured to rearrange the data stream to generate a rearranged data stream; and a stream deparser configured to generate a bitstream based on the data stream or the rearranged data stream according to a reception mode, the reception mode being defined based on a bandwidth and multiple-input and multiple-output (MIMO) used for transmission of the wireless signal.

Embodiments are directed to a method of processing a wireless signal received through at least one antenna, the method including: generating at least one data stream from segments respectively corresponding to different frequency bands; rearranging the at least one data stream; and generating a bitstream based on the at least one data stream or the rearranged at least one data stream according to a reception mode defined based on a bandwidth and multiple-input and multiple-output (MIMO) used for transmission of the wireless signal.

Embodiments are directed to a communication device, including: at least one antenna; a transceiver connected to the at least one antenna; and processing circuitry, wherein the processing circuitry is configured to: generate at least one data stream associated with at least one spatial stream from a signal received through the at least one antenna and the transceiver, decode bitstreams generated from the at least one data stream, rearrange the at least one data stream and generate a bitstream based on the rearranged at least one data stream in a first reception mode, and generate a bitstream based on the at least one data stream in a second reception mode.

BRIEF DESCRIPTION OF THE DRAWINGS

Features will become apparent to those of skill in the art by describing in detail example embodiments with reference to the attached drawings in which:

FIG. 5 is a flowchart of a method of reusing resources in an extended bandwidth, according to an example embodiment;

DETAILED DESCRIPTION

Figure 1:
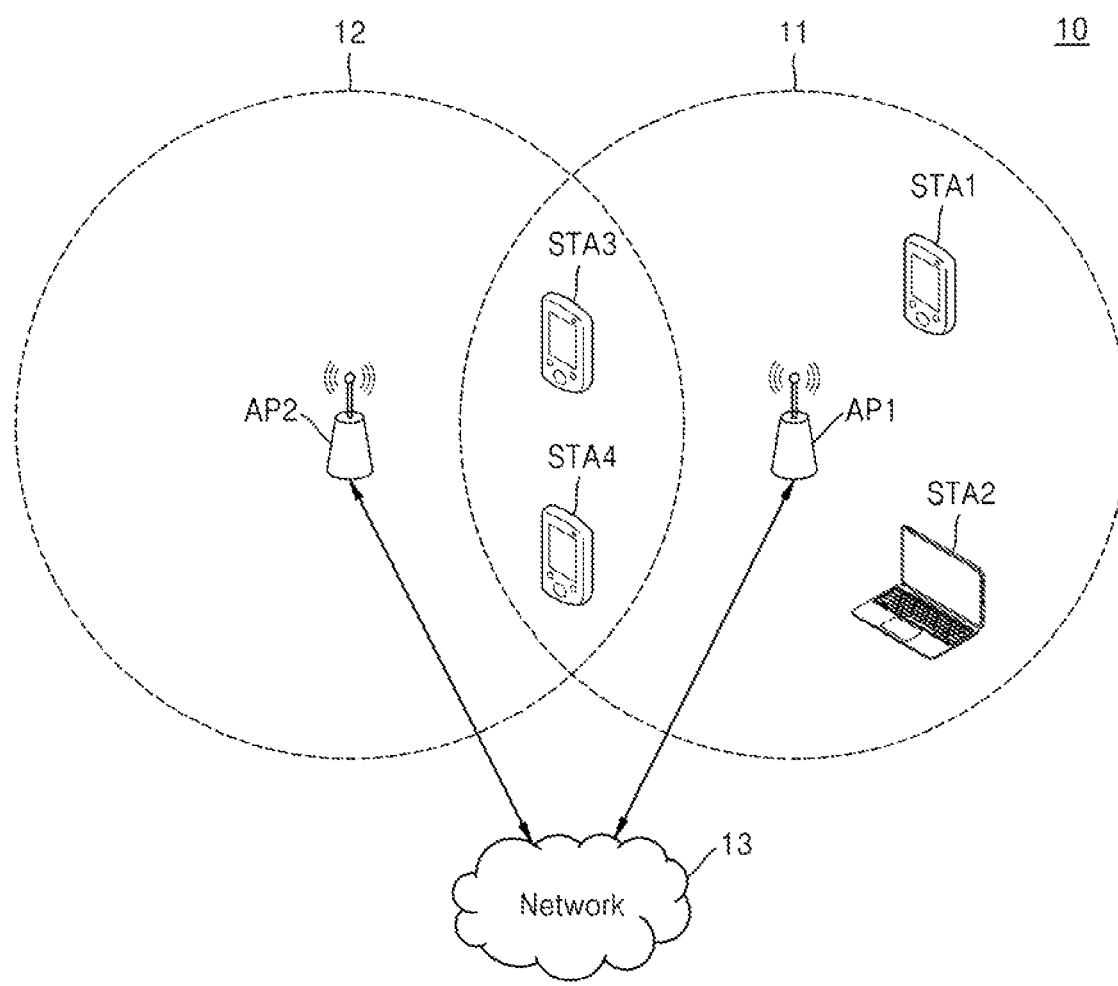
FIG. 1 is a diagram of a wireless communication system according to an example embodiment.

FIG. 1 is a diagram of a wireless communication system 10 according to an example embodiment. Particularly, FIG. 1 shows a wireless local area network (WLAN) system as an example of the wireless communication system 10.

Herein, although an orthogonal frequency division multiple (OFDM)-based wireless communication system or orthogonal frequency division multiple access (OFDMA)-based wireless communication system, particularly, the Institute of Electrical and Electronics Engineers (IEEE) 802.11 standard, is mainly described, embodiments may likewise be applied, with simple modifications, to other communication systems (e.g., cellular communication systems such as a long term evolution (LTE) system, an LTE-advanced (LTE-A) system, a new radio (NR) system, a wireless broadband (WiBro) system, and a global system for mobile communication (GSM) system, and short-range communication systems such as a Bluetooth system and a near field communication (NFC) system) having a similar technical background and channel format.

Herein, hardware-based access methods may be described as examples but both hardware and software, or software, may be employed for various embodiments.

Referring to FIG. 1, the wireless communication system 10 may include first and second access points AP1 and AP2, a first station STA1, a second station STA2, a third station STA3, and a fourth station STA4.

The first and second access points AP1 and AP2 may connect to a network 13 including the Internet, an Internet protocol (IP) network, or any other network. The first access point AP1 may provide access to the network 13 within a first coverage area 11 to the first station STA1, the second station STA2, the third station STA3, and the fourth station STA4. The second access point AP2 may also provide access to the network 13 within a second coverage area 12 to the third and fourth stations STA3 and STA4. The first and second access points AP1 and AP2 may communicate with at least one of the first station STA1, the second station STA2, the station STA3, and the fourth station STA4 based on wireless fidelity (WiFi) or any other WLAN access technology.

An access point may be referred to as a router, a gateway, or the like.

A station may be referred to as a mobile station, a subscriber station, a terminal, a mobile terminal, a wireless terminal, a user equipment, a user, or the like. A station may be a portable device such as a mobile phone, a laptop computer, or a wearable device or a stationary device such as a desktop computer or a smart TV.

Herein, an access point may be referred to as a first device, and a station may be referred to as a second or third device. Examples of an access point and a station will be described below with reference to FIG. 11.

An access point may allocate at least one resource unit (RU) to at least one station. The access point may transmit data through the allocated at least one RU, and the at least one station may receive the data through the allocated at least one RU.

In 802.11ax (hereinafter, high efficiency (HE)), an access point may allocate only a single RU to at least one station, whereas, in 802.11be (hereinafter, extremely high throughput (EHT)) or next generation IEEE 802.11 standards (hereinafter, EHT+), an access point may allocate a multi-resource unit (MRU) including two or more RUs to at least one station. For example, the first access point AP1 may allocate the MRU to at least one of the first station STA1, the second station STA2, the third station STA3, and the fourth station STA4, and may transmit data through the allocated MRU.

An access point and a station may communicate with each other in an extended bandwidth (or channel bandwidth). For example, 802.11n (hereinafter, high throughput (HT)) may support a channel bandwidth of maximum 40 MHz, but 802.11ac (hereinafter, very high throughput (VHT)) and HE may support a channel bandwidth of maximum 160 MHz (including 80 MHz+80 MHz), and EHT may support a channel bandwidth of maximum 320 MHz.

In addition, an access point and a station may communicate with each other based on an increased modulation order. For example, HT may support maximum 64-quadrature amplitude modulation (QAM), but VHT may support maximum 256-QAM, HE may support maximum 1024-QAM, and EHT may support maximum 4096-QAM.

In addition, an access point and a station may communicate with each other based on multiple-input and multiple-output (MIMO) with increased spatial streams. For example, HT may support single user (SU)-MIMO having maximum four spatial streams, but VHT may support not only SU-MIMO having maximum eight spatial streams but also multi-user (MU)-MIMO, and HE may support MU-MIMO having maximum eight spatial streams.

Accordingly, an apparatus, in an access point and/or a station, for processing a wireless signal received through an antenna may have high complexity, and accordingly, an area and power consumption due to hardware may increase.

As described below with reference to the drawings, an apparatus, in an access point and/or a station, for processing a wireless signal received through an antenna may include resources to be reused in an extended bandwidth. Accordingly, regardless of the extended bandwidth, an increased modulation order, and increased spatial streams, the apparatus may be formed with little or no increase in an area and power consumption of the apparatus. Thus, the efficiency of the access point and/or the station may be improved.

Hereinafter, although example embodiments will be described by referring to an example of processing a wireless signal received in a channel bandwidth of 160 MHz, embodiments may also be applied to process a wireless signal received in a channel bandwidth that is, e.g., greater than 160 MHz.

In addition, although example embodiments will be described by mainly referring to an example of processing a wireless signal received through two spatial streams, embodiments may also be applied to process a wireless signal received through, e.g., three or more spatial streams.

Figure 2:
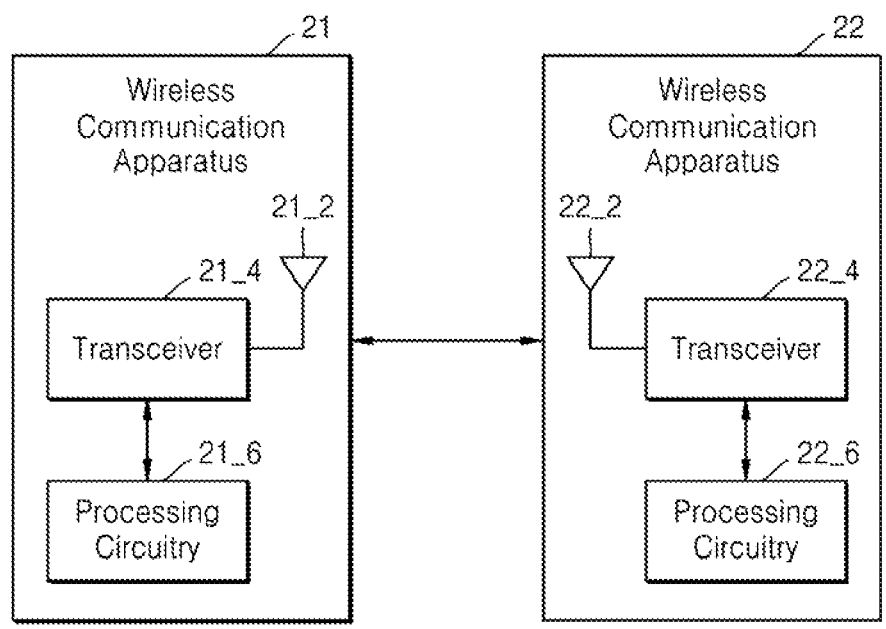
FIG. 2 is a block diagram of a wireless communication system according to an example embodiment.

FIG. 2 is a block diagram of a wireless communication system 20 according to an example embodiment. Particularly, the block diagram of FIG. 2 shows a first wireless communication apparatus 21 and a second wireless communication apparatus 22 in the wireless communication system 20.

Each of the first wireless communication apparatus 21 and the second wireless communication apparatus 22 of FIG. 2 may be an arbitrary apparatus that communicates in the wireless communication system 20, and may be referred to as an apparatus for wireless communication. In an example embodiment, each of the first wireless communication apparatus 21 and the second wireless communication apparatus 22 may be an access point or a station in a WLAN system.

Referring to FIG. 2, the first wireless communication apparatus 21 may include an antenna 21_2, a transceiver 21_4, and processing circuitry 21_6.

The antenna 21_2, the transceiver 21_4, and the processing circuitry 21_6 may be included in one package or individually included in different packages.

The second wireless communication apparatus 22 may include an antenna 22_2, a transceiver 22_4, and processing circuitry 22_6. Elements of the second wireless communication apparatus 22 may be similar to or the same as those of the first wireless communication apparatus 21. Thus, hereinafter, a duplicated description of the first wireless communication apparatus 21 and the second wireless communication apparatus 22 may be omitted.

The antenna 21_2 may receive a signal from the second wireless communication apparatus 22 and provide the signal to the transceiver 21_4, and transmit a signal provided from the transceiver 21_4 to the second wireless communication apparatus 22. The antenna 21_2 may include a plurality of antennas for MIMO. The antenna 21_2 may include a phased array for beamforming.

The transceiver 21_4 may process the signal received from the second wireless communication apparatus 22 through the antenna 21_2, and provide the processed signal to the processing circuitry 21_6. The transceiver 21_4 may process a signal provided from the processing circuitry 21_6, and output the processed signal through the antenna 21_2. The transceiver 21_4 may include analog circuitry including a low noise amplifier, a mixer, a filter, a power amplifier, an oscillator, and the like. The transceiver 21_4 may process the signal received from the antenna 21_2 and/or the signal received from the processing circuitry 21_6, under control of the processing circuitry 21_6.

The transceiver 21_4 may provide a plurality of transmit chains and/or a plurality of receive chains. For example, when the antenna 21_2 includes a plurality of antennas, the transceiver 21_4 may provide a plurality of transmit chains and/or a plurality of receive chains respectively corresponding to the plurality of antennas.

The processing circuitry 21_6 may extract information transmitted from the second wireless communication apparatus 22 by processing the signal received from the transceiver 21_4. For example, the processing circuitry 21_6 may extract the information by demodulating and/or decoding the signal received from the transceiver 21_4.

In addition, the processing circuitry 21_6 may generate a signal including information to be transmitted to the second wireless communication apparatus 22 and provide the generated signal to the transceiver 21_4. For example, the processing circuitry 21_6 may provide, to the transceiver 21_4, a signal generated by encoding and/or modulating data to be transmitted to the second wireless communication apparatus 22.

The processing circuitry 21_6 may include a programmable component such as a central processing unit (CPU) or a digital signal processor (DSP), a reconfigurable component such as a field programmable gate array (FPGA), or a component configured to provide a fixed function, such as an intellectual property (IP) core. The processing circuitry 21_6 may include a memory storing data and/or a series of instructions or access the memory.

The processing circuitry 21_6 may include resources to be reused in an extended bandwidth. For example, as described below with reference to FIG. 4, the processing circuitry 21_6 may use a resource, which processes a signal received in a bandwidth (e.g., 80 MHz) (which may be referred to herein as a limited bandwidth), to also process a signal received in the extended bandwidth (e.g., 160 MHz). Accordingly, separate or dedicated resources for processing a signal received in the extended bandwidth may be omitted from the processing circuitry 21_6. Thus, an area and power consumption of the processing circuitry 21_6 may be reduced.

Figure 3:
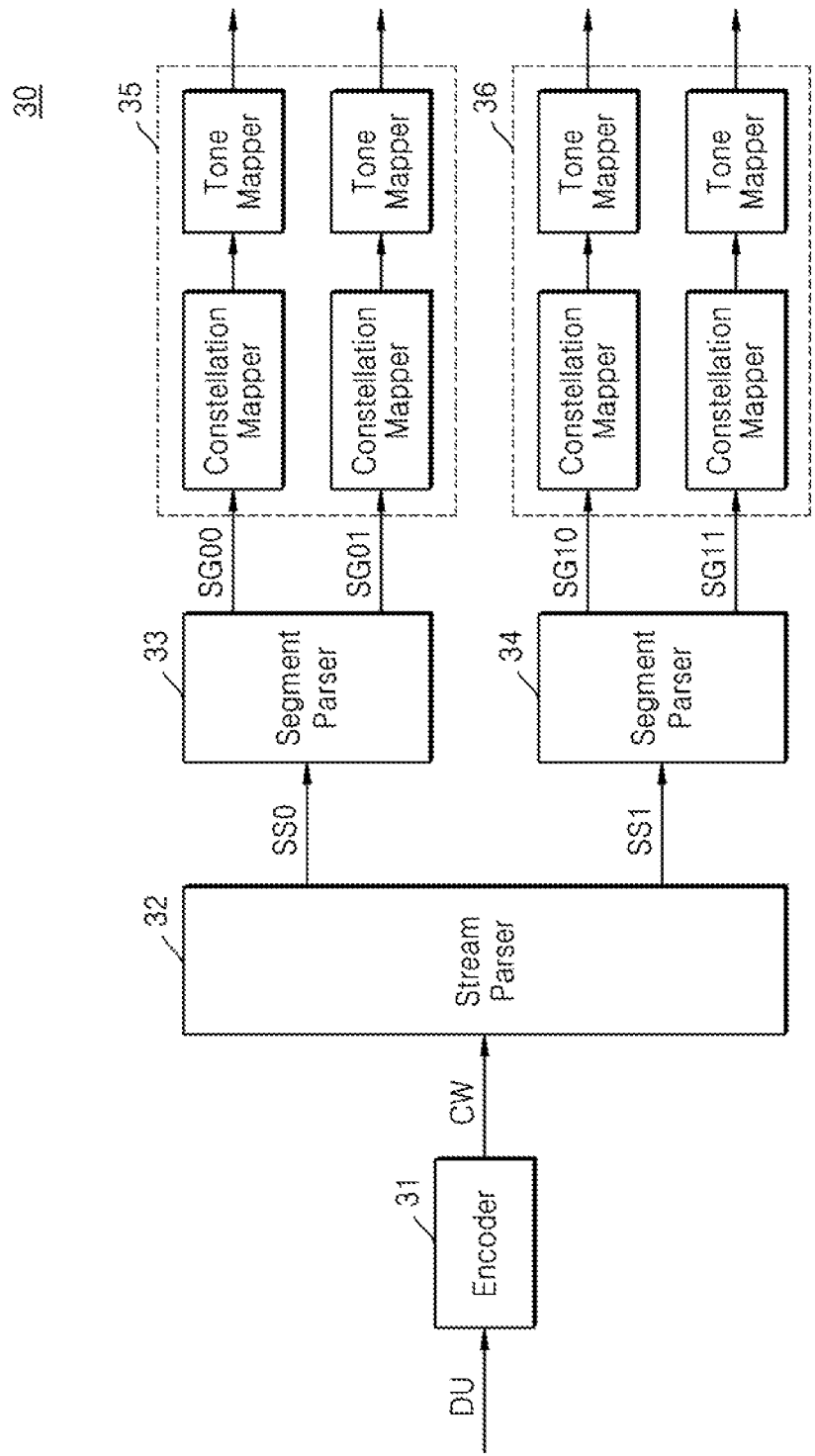
FIG. 3 is a block diagram of a transmission interface according to an example embodiment.

FIG. 3 is a block diagram of a transmission interface 30 according to an example embodiment. The transmission interface 30 may be included in the processing circuitry 21_6 or 22_6 of FIG. 2. Also, the processing circuitry 21_6 or 22_6 of FIG. 2 may include a reception interface (e.g., 40 of FIG. 4) configured to inversely perform operations performed by the transmission interface 30.

Referring to FIG. 3, the transmission interface 30 may include an encoder 31, a stream parser 32, a first segment parser 33, a second segment parser 34, a first mapper 35, and a second mapper 36. A post-forward error correction (FEC) physical (PHY) padding block (not shown) may be inserted between the encoder 31 and the stream parser 32.

The encoder 31 may generate a codeword CW by encoding a data unit DU. For example, the encoder 31 may encode the data unit DU based on a random encoding scheme such as a binary convolution code (BCC) scheme, a low-density parity-check (LDPC) scheme, or a turbo code scheme and provide the codeword CW to the stream parser 32.

The stream parser 32 may receive the codeword CW from the encoder 31, and generate a first spatial stream SS0 and a second spatial stream SS1 from the codeword CW. For example, the stream parser 32 may generate the first spatial stream SS0 and the second spatial stream SS1 based on Equations 1 below.

$$s = \max\left(1, \frac{N_{BPSCS}}{2}\right)$$ [Equations 1]

$$S = N_{SS} \cdot s$$

$$i = (i_{SS} - 1) \cdot s + S \cdot \left\lfloor \frac{k}{s} \right\rfloor + (k \bmod s)$$

$$i_{SS} = 1, 2, \ldots, N_{SS}$$

$$i = 0, 1, \ldots, N_{CBPS} - 1$$

$$k = 0, 1, \ldots, N_{CBPSS} - 1$$

In Equations 1, s denotes the number of bits parsed using one antenna for each round, $N_{BPSCS}$ denotes the number of bits coded per subcarrier per spatial stream, $i_{SS}$ denotes an index of a spatial stream, $N_{SS}$ denotes the number of spatial streams, $N_{CBPS}$ denotes the number of bits coded per symbol, and $N_{CBPSS}$ denotes the number of bits coded per symbol per spatial stream.

Each of the first segment parser 33 and the second segment parser 34 may generate a plurality of segments respectively corresponding to a plurality of different bands from a spatial stream. For example, referring to FIG. 3, the first segment parser 33 may generate two first segments SG00 and SG01 from the first spatial stream SS0, and the second segment parser 34 may generate two second segments SG10 and SG11 from the second spatial stream SS1. The two first segments SG00 and SG01 and the two second segments SG10 and SG11 may correspond to different bands having a bandwidth of 80 MHz, respectively.

Herein, a segment may be referred to as a frequency sub-block, a frequency segment, or the like.

Each of the first segment parser 33 and the second segment parser 34 may generate segments based on Equations 2 below.

$$y_{k,l} = x_m$$ [Equations 2]

$$m = 2s \cdot \left\lfloor \frac{k}{s} \right\rfloor + l \cdot s + (k \bmod s), k = 0, 1, \ldots, \frac{N_{CBPSS}}{2} - 1$$

$$m = 0, \ldots, N_{CBPSS} - 1$$

$$l = 0, 1$$

$$s = \max\left(1, \frac{N_{BPSCS}}{2}\right)$$

In Equations 2, $x_m$ denotes a bit m in a block having $N_{CBPS}$ bits, l denotes an index of a frequency sub-block, and $y_{k,l}$ denotes a bit k in the frequency sub-block l.

Each of the first mapper 35 and the second mapper 36 may include a constellation mapper and a tone mapper. For example, referring to FIG. 3, the first mapper 35 may include two constellation mappers and two tone mappers for the two first segments SG00 and SG01, and the second mapper 36 may include two constellation mappers and two tone mappers for the two second segments SG10 and SG11.

A constellation mapper may map bits in a segment to constellation points according to a selected modulation scheme. As a modulation order increases, the more bits may be mapped at once.

A tone mapper may map constellation points to spaced subcarriers.

Figure 4:
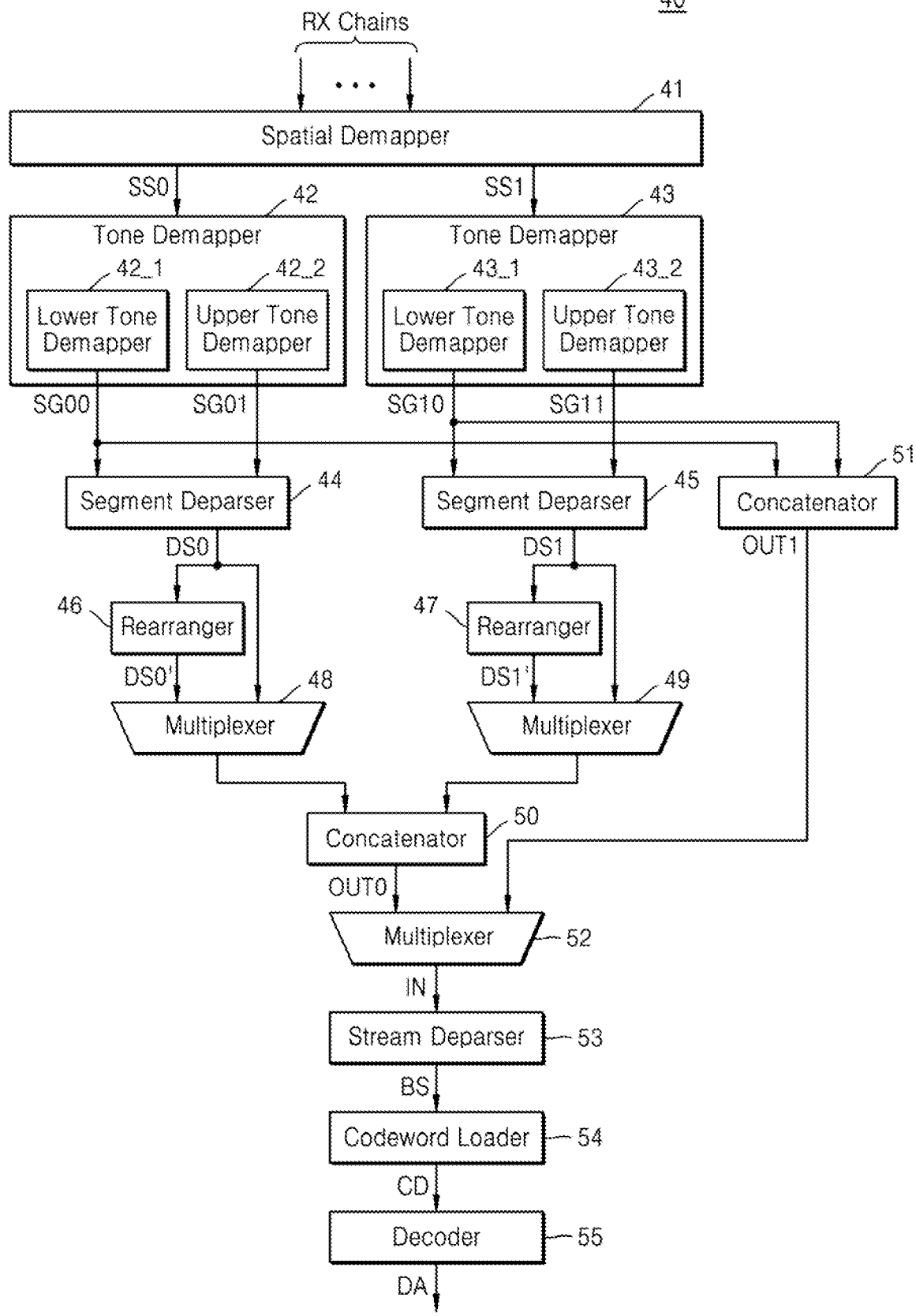
FIG. 4 is a block diagram of a reception interface according to an example embodiment.

FIG. 4 is a block diagram of a reception interface 40 according to an example embodiment. As noted above, the reception interface 40 may be included in the processing circuitry 21_6 or 22_6 of FIG. 2.

Referring to FIG. 4, the reception interface 40 may include a spatial demapper 41, a first tone demapper 42, a second tone demapper 43, a first segment deparser 44, a second segment deparser 45, a first rearranger 46, a second rearranger 47, a first multiplexer 48, a second multiplexer 49, a first concatenator 50, a second concatenator 51, a third multiplexer 52, a stream deparser 53, a codeword loader 54, and a decoder 55.

The spatial demapper 41 may generate the first spatial stream SS0 and the second spatial stream SS1 from signals received through receive chains. The first spatial stream SS0 and the second spatial stream SS1 may include a log likelihood ratio (LLR) corresponding to a probability that a received bit is 0 (or 1). For example, a data subcarrier of an OFDM symbol may have a number of bits corresponding to maximum constellation points, and accordingly, when the number of LLR bits corresponding to one bit in HE supporting maximum 1024-QAM is 5, a data subcarrier in one spatial stream may have maximum 50 bits. In the present example embodiment, for convenience of explanation it is assumed that the number of LLR bits is 5, but the number may be varied.

The spatial demapper 41 may detect MIMO from signals received through the receive chains.

Referring to FIG. 4, the first spatial stream SS0 may be provided to the first tone demapper 42, and the second spatial stream SS1 may be provided to the second tone demapper 43.

The first tone demapper 42 may include a lower tone demapper 42_1 and an upper tone demapper 42_2, and generate the first segments SG00 and SG01 from the first spatial stream SS0 by inversely performing an operation of a tone mapper included in the transmission interface 30 of FIG. 3. For example, the lower tone demapper 42_1 and the upper tone demapper 42_2 may generate the first segments SG00 and SG01 by reordering an input. Referring to FIG. 4, the lower tone demapper 42_1 may generate the first segment SG00 corresponding to a lower band (e.g., lower 80 MHz), and the upper tone demapper 42_2 may generate the first segment SG01 corresponding to an upper band (e.g., upper 80 MHz).

The second tone demapper 43 may also include a lower tone demapper 43_1 and an upper tone demapper 43_2, and generate the second segments SG10 and SG11 from the second spatial stream SS1.

The first segment deparser 44 may receive the first segments SG00 and SG01 from the first tone demapper 42, and generate a first data stream DS0 from the first segments SG00 and SG01 by inversely performing an operation of the first segment parser 33 of FIG. 3. As described above, a data subcarrier in each of the first segments SG00 and SG01 may have maximum 50 bits, and accordingly, the first data stream DS0 may have maximum 100 bits.

The second segment deparser 45 may receive the second segments SG10 and SG11 from the second tone demapper 43, and generate a second data stream DS1 from the second segments SG10 and SG11 by inversely performing an operation of the second segment parser 34 of FIG. 3. As described above, a data subcarrier in each of the second segments SG10 and SG11 may have maximum 50 bits, and accordingly, the second data stream DS1 may have maximum 100 bits.

When a wireless signal is received in an extended bandwidth (e.g., 160 MHz or 80+80 MHz), the first segment deparser 44 and the second segment deparser 45 may be enabled, and the first data stream DS0 and the second data stream DS1 may be used.

The second concatenator 51 may generate a second output OUT1 by concatenating the first segment SG00 (which is generated by the lower tone demapper 42_1 included in the first tone demapper 42) and the second segment SG10 (which is generated by the lower tone demapper 43_1 included in the second tone demapper 43).

When a wireless signal is received in a bandwidth (e.g., 20 MHz, 40 MHz, or 80 MHz) that is less than the extended bandwidth, the second concatenator 51 may be enabled, and the second output OUT1 may be used.

As described above, a data subcarrier in each of the first segment SG00 and the second segment SG10 may have maximum 50 bits, and accordingly, the second output OUT1 may have maximum 100 bits.

The first rearranger 46 may receive the first data stream DS0, and generate a rearranged first data stream DS0' by rearranging the first data stream DS0.

The second rearranger 47 may receive the second data stream DS1, and generate a rearranged second data stream DS1' by rearranging the second data stream DS1.

The first rearranger 46 and the second rearranger 47 may generate the rearranged first data stream DS0' and the rearranged second data stream DS1'.

When a wireless signal is received based on MIMO in the extended bandwidth (e.g., 160 MHz or 80+80 MHz), the first rearranger 46 and the second rearranger 47 may be enabled, and the rearranged first data stream DS0' and the rearranged second data stream DS1' may be used.

The first multiplexer 48 may provide one of the first data stream DS0 and the rearranged first data stream DS0' to the first concatenator 50. The first multiplexer 48 may provide the rearranged first data stream DS0' to the first concatenator 50 when MIMO is detected, and provide the first data stream DS0 to the first concatenator 50 when MIMO is not detected. The first multiplexer 48 may receive a control signal from the spatial demapper 41 that is configured to detect MIMO.

The second multiplexer 49 may provide one of the second data stream DS1 and the rearranged second data stream DS1' to the first concatenator 50. The second multiplexer 49 may provide the rearranged second data stream DS1' to the first concatenator 50 when MIMO is detected, and provide the second data stream DS1 to the first concatenator 50 when MIMO is not detected. The second multiplexer 49 may receive a control signal from the spatial demapper 41 that is configured to detect MIMO.

The first concatenator 50 may generate a first output OUT0 by concatenating an output of the first multiplexer 48 and an output of the second multiplexer 49.

When a wireless signal is received in the extended bandwidth (e.g., 160 MHz or 80+80 MHz), the first concatenator 50 may be enabled, and differently concatenate the output of the first multiplexer 48 and the output of the second multiplexer 49 according to whether MIMO is detected. The first concatenator 50 may receive a control signal from the spatial demapper 41 that is configured to detect MIMO.

The third multiplexer 52 may provide one of the first output OUT0 of the first concatenator 50 and the second output OUT1 of the second concatenator 51 to the stream deparser 53 as an input IN. For example, the third multiplexer 52 may provide the first output OUT0 to the stream deparser 53 when a wireless signal is received in the extended bandwidth (e.g., 160 MHz or 80+80 MHz), and provide the second output OUT1 to the stream deparser 53 when a wireless signal is received in a bandwidth (e.g., 20

MHz, 40 MHz, or 80 MHz) that is less than the extended bandwidth. The processing circuitry that includes the reception interface 40 may also include a controller, and the controller may control the third multiplexer 52 based on a bandwidth of a received wireless signal.

The stream deparser 53 (described further below) may process a wireless signal received in the limited bandwidth (e.g., 80 MHz). Also, the stream deparser 53 may process a wireless signal received in the extended bandwidth (e.g., 160 MHz), i.e., may be reused to process the wireless signal received in the extended bandwidth (e.g., 160 MHz).

The stream deparser 53 may receive the input IN from the third multiplexer 52, and generate a bitstream B S from the input IN by inversely performing an operation of the stream parser 32 of FIG. 3.

When MIMO is detected, the stream deparser 53 may generate the bitstream BS from the input IN by inversely performing an operation based on equations 1. Otherwise, when MIMO is not detected, the stream deparser 53 may generate the bitstream BS by bypassing the input IN.

As described above, the stream deparser 53 may be configured to process a wireless signal received in the limited bandwidth (e.g., 80 MHz), and accordingly, when a wireless signal is received in the extended bandwidth (e.g., 160 MHz), the stream deparser 53 may sequentially process signals corresponding to the limited bandwidth.

The codeword loader 54 may receive the bitstream BS from the stream deparser 53 and generate codeword data CD from the bitstream BS.

The codeword data CD may have a number of bits corresponding to a product (e.g., 648×5 bits, 1296×5 bits, or 1944×5 bits) of the number of bits of a codeword (e.g., 648 bits, 1296 bits, or 1944 bits) and the number of LLR bits (e.g., 5).

The codeword loader 54 may temporarily store the bitstream BS, and output collected bitstreams as the codeword data CD.

The decoder 55 may receive the codeword data CD from the codeword loader 54, and generate data DA by decoding the codeword data CD based on a decoding scheme corresponding to an encoding scheme used in a transmission interface.

FIG. 5 is a flowchart of a method of reusing resources in an extended bandwidth, according to an example embodiment.

Hereinafter, FIG. 5 will be described with reference also to FIG. 4. The method of FIG. 5 may be performed by the reception interface 40 of FIG. 4.

Referring to FIG. 5, the method of reusing resources in the extended bandwidth may include a plurality of operations S110 to S220.

In operation S110, a spatial stream may be generated. For example, the spatial demapper 41 may generate the first spatial stream SS0 and the second spatial stream SS1 from signals received through receive chains.

In operation S120, a segment may be generated. For example, the first tone demapper 42 may generate the first segments SG00 and SG01 from the first spatial stream SS0, and the second tone demapper 43 may generate the second segments SG10 and SG11 from the second spatial stream SS1.

In operation S130, it may be determined whether a wireless signal has been received in the extended bandwidth. For example, processing circuitry included in an access point may determine whether an uplink bandwidth allocated to a station is the extended bandwidth, and processing circuitry included in the station may determine whether a bandwidth identified by demodulating and decoding a wireless signal received from the access point is the extended bandwidth.

When the extended bandwidth is identified, operation S140 may be subsequently performed.

When the extended bandwidth is not identified, operation S180 may be subsequently performed.

(I) Extended Bandwidth is Identified in Operation 130

In operation S140, a data stream may be generated. For example, the first segment deparser 44 may generate the first data stream DS0 from the first segments SG00 and SG01 associated with the first spatial stream SS0, and the second segment deparser 45 may generate the second data stream DS1 from the second segments SG10 and SG11 associated with the second spatial stream SS1.

In operation S150, it may be determined whether MIMO has been detected. For example, the spatial demapper 41 may detect MIMO based on the signals received through the receive chains, and generate a signal indicating a MIMO detection result.

When MIMO is detected in the extended bandwidth, operation S160 may be subsequently performed.

When MIMO is not detected, operation S210 may be subsequently performed.

A mode of receiving a wireless signal based on MIMO in the extended bandwidth may be referred to as a first reception mode.

A mode of receiving a wireless signal based on single-input and single-output (SISO) in the extended bandwidth may be referred to as a fourth reception mode.

In the first reception mode, operations S160, S170, S200, and S210 (described below) may be performed following operation S150.

In the fourth reception mode, whereas operation S210 may be performed following operation S150.

In operation S160, the data stream may be rearranged. For example, in the first reception mode, the first rearranger 46 may generate the rearranged first data stream DS0' from the first data stream DS0, and the second rearranger 47 may generate the rearranged second data stream DS1' from the second data stream DS1. An example of an operation of rearranging a data stream will be described below with reference to FIG. 7.

In operation S170, data streams may be concatenated. For example, in the first reception mode, the first concatenator 50 may generate the first output OUT0 by concatenating the rearranged first data stream DS0' and the rearranged second data stream DS1'. An example of an operation of the first concatenator 50 will be described below with reference to FIG. 7.

(II) Extended Bandwidth is not Identified in Operation 130

In operation S180, it may be determined whether MIMO has been detected. For example, the spatial demapper 41 may detect MIMO based on the signals received through the receive chains, and generate a signal indicating a MIMO detection result.

When MIMO is detected, operation S190 may be subsequently performed.

When MIMO is not detected, operation S210 may be subsequently performed.

A mode of receiving a wireless signal based on MIMO in a bandwidth less than the extended bandwidth may be referred to as a second reception mode.

A mode of receiving a wireless signal based on SISO in a bandwidth less than the extended bandwidth may be referred to as a third reception mode.

Operations S190, S200, and S210 may be performed following operation S180 in the second reception mode.

Operation S210 may be performed following operation S180 in the third reception mode.

In operation S190, data streams may be concatenated. For example, in the second reception mode, the second concatenator 51 may generate the second output OUT1 by concatenating the first segment SG00 (which is generated by the lower tone demapper 42_1 included in the first tone demapper 42) and the second segment SG10 (which is generated by the lower tone demapper 43_1 included in the second tone demapper 43).

In operation S200, a bitstream may be generated. For example, in the first reception mode, the stream deparser 53 may generate the bitstream BS from the first output OUT0 provided from the first concatenator 50. Alternatively, in the second reception mode, the stream deparser 53 may generate the bitstream BS from the second output OUT1 provided from the second concatenator 51.

In operation S210, codeword data may be generated. For example, the codeword loader 54 may receive the bitstream BS generated by the stream deparser 53 from the input IN in the first and second reception modes, whereas, in the third and fourth reception modes, the input IN may bypass the stream deparser 53, and the codeword loader 54 may receive the bitstream BS that is the same as the input IN. The codeword loader 54 may generate the codeword data CD by collecting bitstreams.

In operation S220, the codeword data may be decoded. For example, the decoder 55 may generate the data DA by decoding the codeword data CD.

Figure 6A:
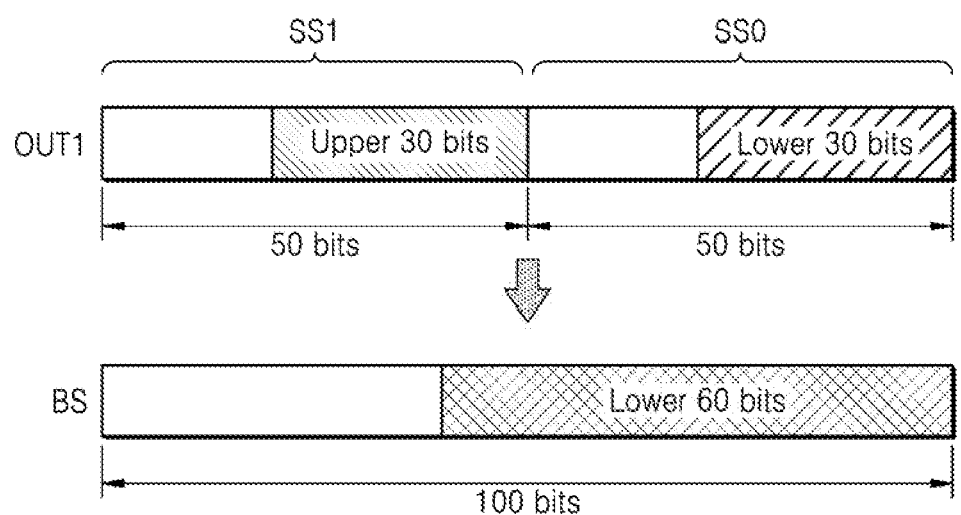
FIGS. 6A, 6B, and 6C illustrate operations of generating a bitstream from a data stream, according to an example embodiment.
Figure 6B:
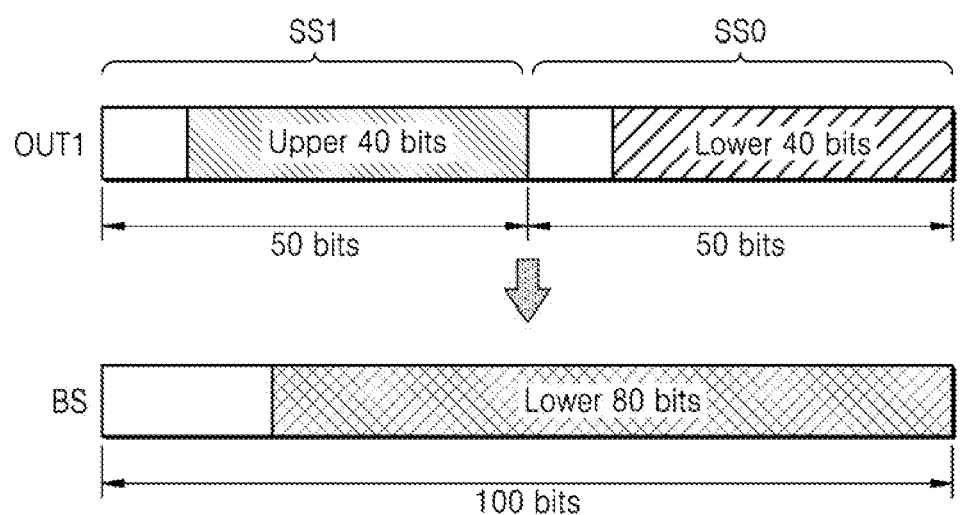
Figure 6C:
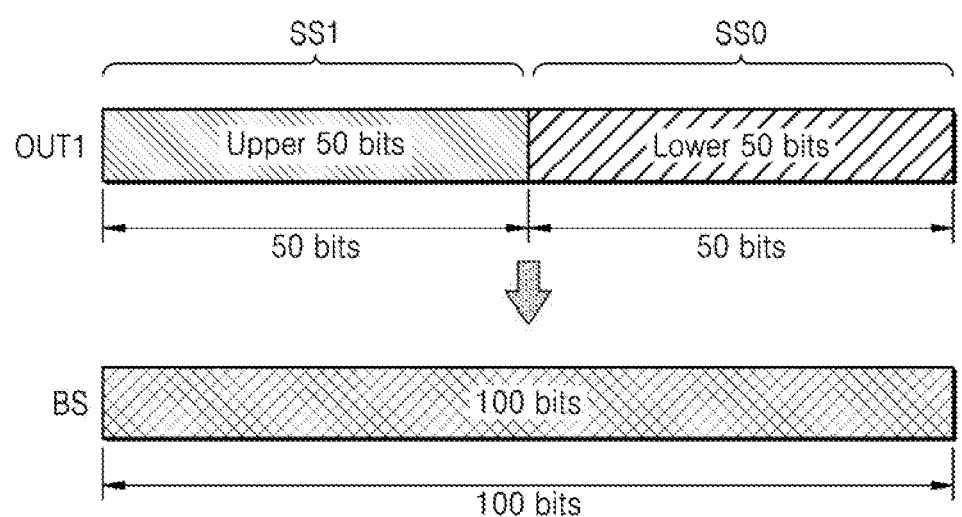

FIGS. 6A, 6B, and 6C illustrate operations of generating a bitstream from a data stream, according to an example embodiment. Particularly, FIG. 6A illustrates an operation of the stream deparser 53 of FIG. 4 when a wireless signal modulated based on 64-QAM is received in the second reception mode, FIG. 6B illustrates an operation of the stream deparser 53 of FIG. 4 when a wireless signal modulated based on 256-QAM is received in the second reception mode, and FIG. 6C illustrates an operation of the stream deparser 53 of FIG. 4 when a wireless signal modulated based on 1024-QAM is received in the second reception mode, Hereinafter, FIGS. 6A, 6B, and 6C will be described with reference also to FIG. 4.

Referring to FIG. 6A, when a wireless signal modulated based on 64-QAM is received in the second reception mode, a data subcarrier in the first segment SG00 associated with the first spatial stream SS0 and corresponding to a lower band may have 30 bits, and a data subcarrier in the second segment SG10 associated with the second spatial stream SS1 and corresponding to the lower band may have 30 bits.

Referring to FIG. 6A, the second concatenator 51 may generate the second output OUT1 of 100 bits by concatenating the 30 bits of the first segment SG00 and the 30 bits of the second segment SG10. Accordingly, referring to FIG. 6A, the stream deparser 53 may generate the bitstream BS of 100 bits including valid 60 bits Referring to FIG. 6B, when a wireless signal modulated based on 256-QAM is received in the second reception mode, a data subcarrier in the first segment SG00 associated with the first spatial stream SS0 and corresponding to the lower band may have 40 bits, and a data subcarrier in the second segment SG10 associated with the second spatial stream SS1 and corresponding to the lower band may have 40 bits.

Referring to FIG. 6B, the second concatenator 51 may generate the second output OUT1 of 100 bits by concatenating the 40 bits of the first segment SG00 and the 40 bits of the second segment SG10. Accordingly, referring to FIG. 6B, the stream deparser 53 may generate the bitstream BS of 100 bits including valid 80 bits Referring to FIG. 6C, when a wireless signal modulated based on 1024-QAM is received in the second reception mode, a data subcarrier in the first segment SG00 associated with the first spatial stream SS0 and corresponding to the lower band may have 50 bits, and a data subcarrier in the second segment SG10 associated with the second spatial stream SS1 and corresponding to the lower band may have 50 bits.

Referring to FIG. 6C, the second concatenator 51 may generate the second output OUT1 of 100 bits by concatenating the 50 bits of the first segment SG00 and the 50 bits of the second segment SG10. Accordingly, referring to FIG. 6C, the stream deparser 53 may generate the bitstream BS of valid 100 bits.

Figure 7:
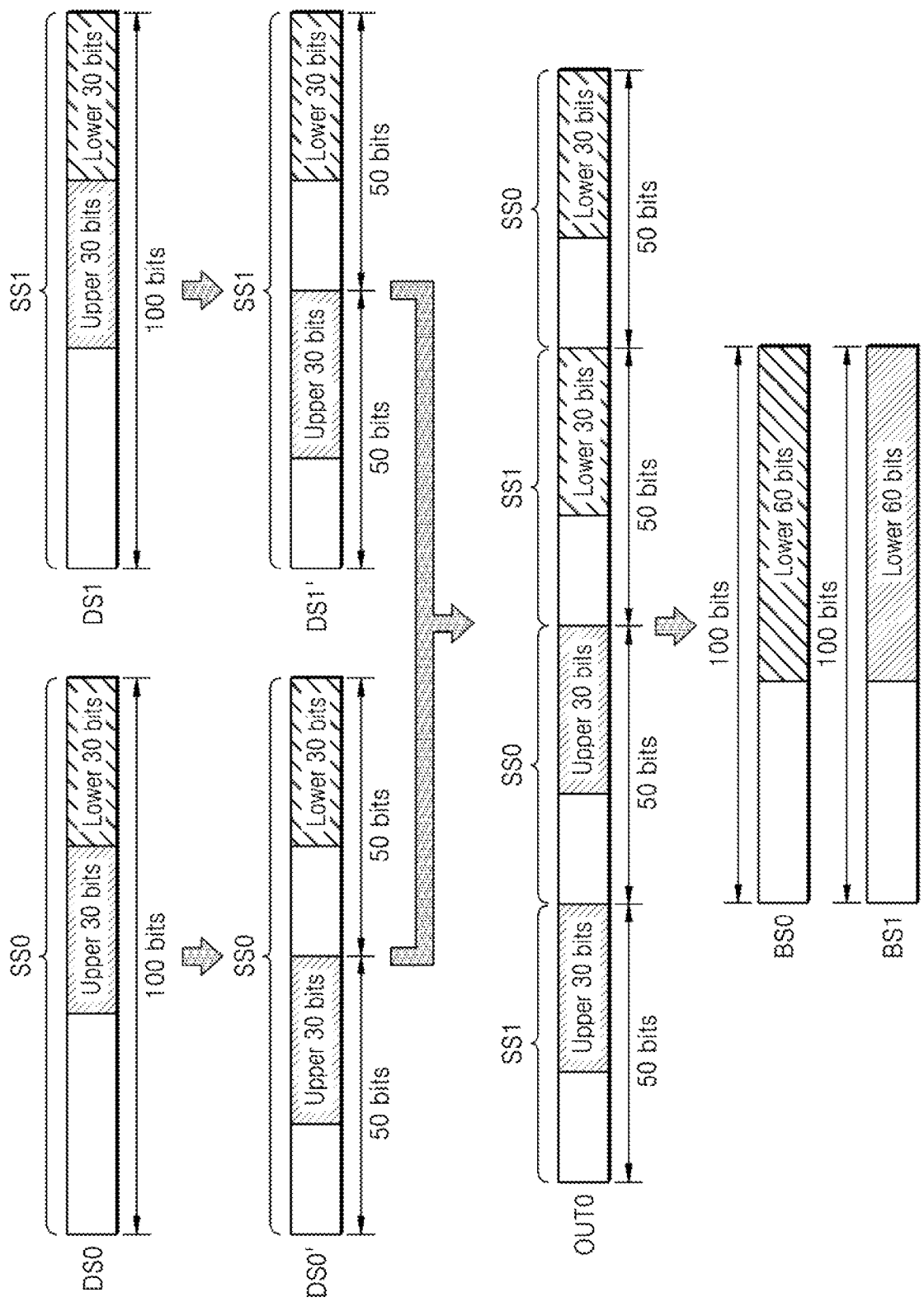
FIG. 7 illustrates an operation of generating a bitstream from a data stream, according to an example embodiment.

FIG. 7 illustrates an operation of generating a bitstream from a data stream, according to an example embodiment. Particularly, FIG. 7 shows an example of an operation of the reception interface 40 of FIG. 4 when a wireless signal modulated based on 64-QAM is received in the first reception mode. It will be understood that, even in modulation orders different from 64-QAM, the reception interface 40 may operate similarly to that shown in FIG. 7. Hereinafter, FIG. 7 will be described with reference also to FIG. 4.

Referring to FIG. 7, when a wireless signal modulated based on 64-QAM is received in the first reception mode, a data subcarrier in the first segments SG00 and SG01 associated with the first spatial stream SS0 may have 30 bits, and a data subcarrier in the second segments SG10 and SG11 associated with the second spatial stream SS1 may have 30 bits. Accordingly, the first segment deparser 44 may generate the first data stream DS0 having a 100-bit length including valid 60 bits from the first segments SG00 and SG01, and the second segment deparser 45 may generate the second data stream DS1 having a 100-bit length including valid 60 bits from the second segments SG10 and SG11.

The first rearranger 46 may generate the rearranged first data stream DS0' by shifting the upper half of the valid bits of the first data stream DS0. For example, referring to FIG. 7, the first rearranger 46 may shift the upper 30 bits of the valid 60 bits of the first data stream DS0 to be arranged in upper 50 bits among the 100 bits. In addition, the second rearranger 47 may generate the rearranged second data stream DS1' by shifting the upper half of the valid bits of the second data stream DS1. For example, referring to FIG. 7, the second rearranger 47 may shift the upper 30 bits of the valid 60 bits of the second data stream DS1 to be arranged in upper 50 bits among the 100 bits.

The first concatenator 50 may concatenate the lower half of the rearranged first data stream DS0' and the lower half of the rearranged second data stream DS1', and concatenate the upper half of the rearranged first data stream DS0' and the upper half of the rearranged second data stream DS1'. Accordingly, referring to FIG. 7, the first output OUT0 generated by the first concatenator 50 may sequentially include 50 bits associated with the first spatial stream SS0 and corresponding to a lower band, 50 bits associated with the second spatial stream SS1 and corresponding to the lower band, 50 bits associated with the first spatial stream SS0 and corresponding to an upper band, and 50 bits associated with the second spatial stream SS1 and corresponding to the upper band.

The first concatenator 50 may provide lower 100 bits of the first output OUT0 having 200 bits to the stream deparser 53 as a first input, and then provide upper 100 bits of the first output OUT0 having 200 bits to the stream deparser 53 as a second input.

The stream deparser 53 may sequentially process the first and second inputs provided from the first concatenator 50. For example, referring to FIG. 7, the stream deparser 53 may generate a first bitstream BS0 of 100 bits including valid 60 bits by processing the first input of 100 bits, and generate a second bitstream BS1 of 100 bits including valid 60 bits by processing the second input of 100 bits.

Accordingly, the stream deparser 53 designed to generate a bitstream of 100 bits may be reused in an extended bandwidth, and as a result, an additional stream deparser designed to generate a bitstream from the first data stream DS0 of 100 bits and the second data stream DS1 of 100 bits in the first reception mode may be omitted from processing circuitry.

Figure 8:
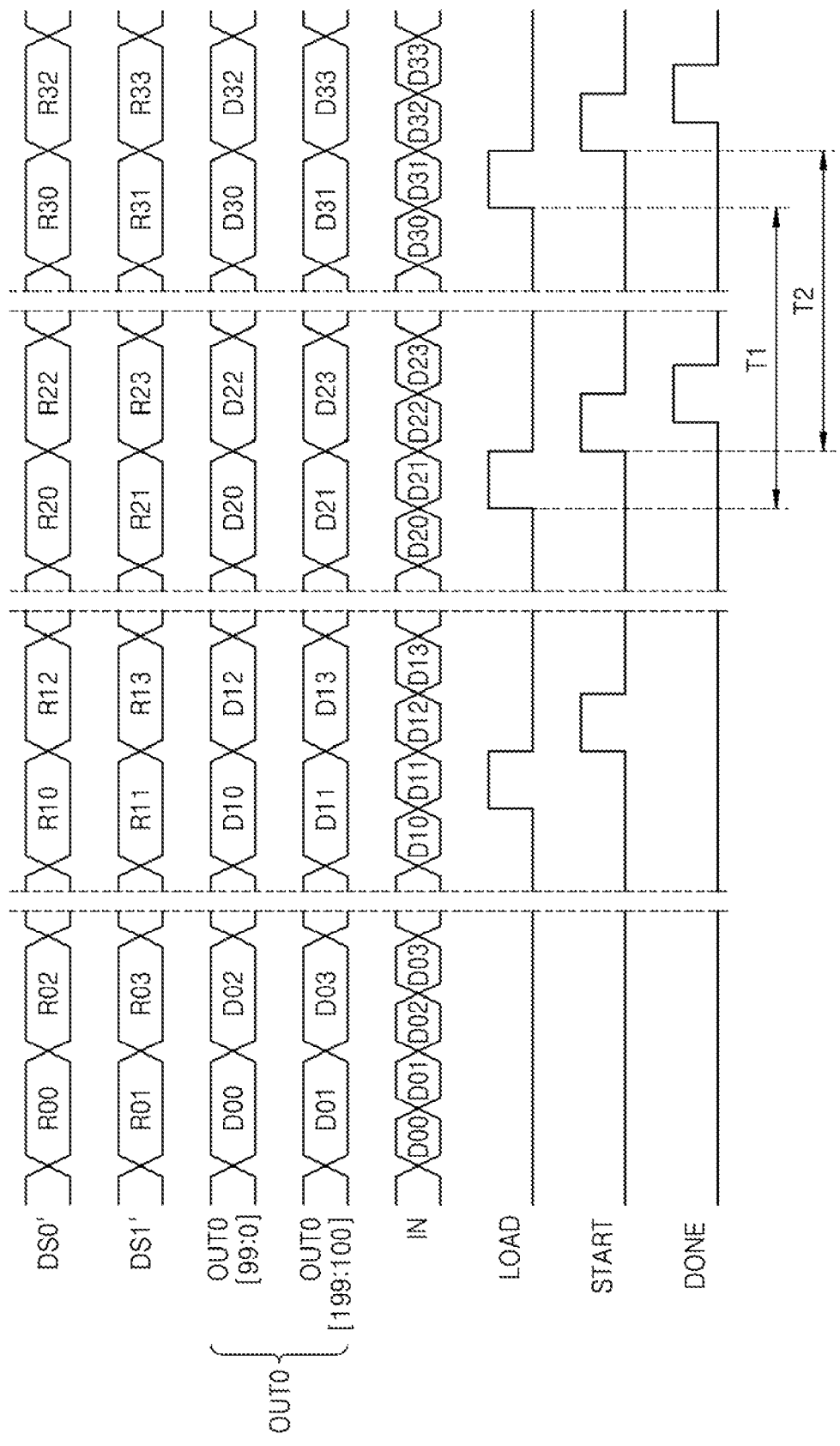
FIG. 8 is a timing diagram of an operation of a reception interface, according to an example embodiment.

FIG. 8 is a timing diagram of an operation of a reception interface, according to an example embodiment. Particularly, the timing diagram of FIG. 8 shows signals generated by the reception interface in the first reception mode. The reception interface 40 of FIG. 4 may operate in synchronization with clocks. Hereinafter, FIG. 8 will be described with reference also to FIGS. 4 and 7.

Referring to FIG. 8, as described above with reference to FIG. 7, the lower half (OUT0[99:0]) and the upper half (OUT0[199:100]) of the first output OUT0 may be generated from the rearranged first data stream DS0' and the rearranged second data stream DS1'.

The lower half OUT0[99:0] and the upper half OUT0[199:100] of the first output OUT0 may be sequentially provided to the stream deparser 53 as the input IN.

LOAD of FIG. 8 denotes an active high signal, and may be activated when the codeword loader 54 provides, to the decoder 55, the codeword data CD generated from bitstreams.

START of FIG. 8 denotes an active high signal, and may be activated when the decoder 55 starts decoding.

DONE of FIG. 8 denotes an active high signal, and may be activated when the decoder 55 ends the decoding.

Referring to FIG. 8, the codeword data CD may be generated in every first period T1, and decoding of the codeword data CD may end in every second period T2.

As described above with reference to FIG. 7, the stream deparser 53 may be time-shared in an extended bandwidth, and accordingly, generation of the codeword data CD may be delayed. However, referring to FIG. 8, due to a time taken to perform decoding by the decoder 55, the first period T1 and the second period T2 may be approximately the same, and accordingly, despite reuse of the stream deparser 53 in the extended bandwidth, generation of the data DA may not be delayed.

Figure 9:
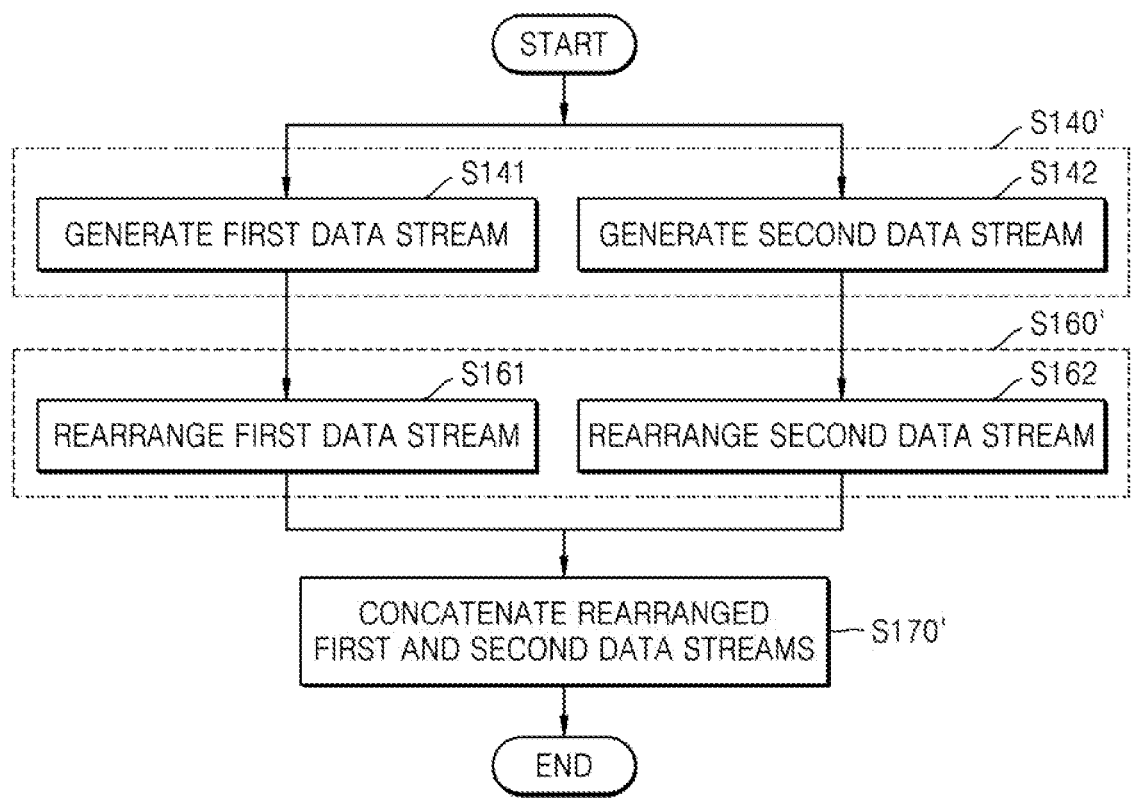
FIG. 9 is a flowchart of a method of reusing resources in an extended bandwidth, according to an example embodiment.

FIG. 9 is a flowchart of a method of reusing resources in an extended bandwidth, according to an example embodiment. Particularly, the flowchart of FIG. 9 shows an example of operations S140, S160, and S170 of FIG. 5 in the first reception mode. Similarly to that described above with reference to FIG. 5, a data stream may be generated in operation S140' of FIG. 9, the data stream may be rearranged in operation S160' of FIG. 9, and data streams may be concatenated in operation S170' of FIG. 9. Operations S140', S160', and S170' may be performed by the reception interface 40 of FIG. 4. Hereinafter, FIG. 9 will be described with reference also to FIGS. 4 and 5.

Referring to FIG. 9, operation S140' may include operations S141 and S142.

In operation S141, the first data stream DS0 may be generated. For example, the first segment deparser 44 may generate the first data stream DS0 from the first segments SG00 and SG01 associated with the first spatial stream SS0.

In operation S142, the second data stream DS1 may be generated. For example, the second segment deparser 45 may generate the second data stream DS1 from the second segments SG10 and SG11 associated with the second spatial stream SS1.

As described above with reference to FIG. 7, each of the first data stream DS0 and the second data stream DS1 may have a 100-bit length and include valid bits.

Operation S160' may include operations S161 and S162.

In operation S161, the first data stream DS0 may be rearranged. For example, the first rearranger 46 may generate the rearranged first data stream DS0' by rearranging the first data stream DS0.

In operation S162, the second data stream DS1 may be rearranged. For example, the second rearranger 47 may generate the rearranged second data stream DS1' by rearranging the second data stream DS1.

As described above with reference to FIG. 7, the first rearranger 46 may shift some bits of the first data stream DS0, and the second rearranger 47 may shift some bits of the second data stream DS1.

In operation S170', the rearranged first data stream DS0' and the rearranged second data stream DS1' may be concatenated. For example, as described above with reference to FIG. 7, the first concatenator 50 may concatenate the lower half of the rearranged first data stream DS0' and the lower half of the rearranged second data stream DS1', and concatenate the upper half of the rearranged first data stream DS0' and the upper half of the rearranged second data stream DS1'.

Figure 10:
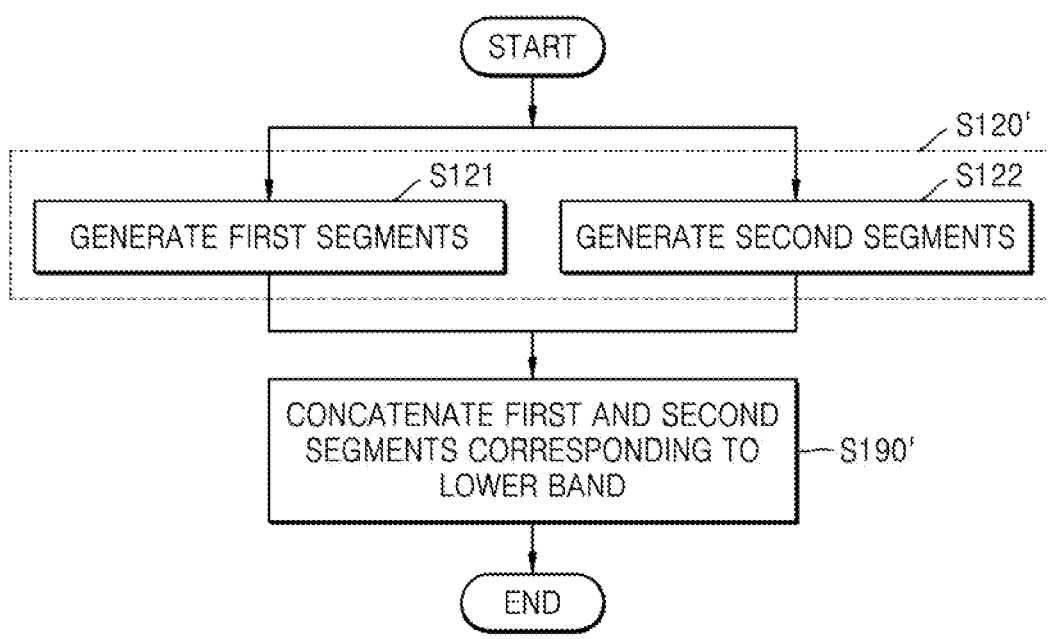
FIG. 10 is a flowchart of a method of reusing resources in an extended bandwidth, according to an example embodiment.

FIG. 10 is a flowchart of a method of reusing resources in an extended bandwidth, according to an example embodiment. Particularly, the flowchart of FIG. 10 shows an example of operations S120 and S190 of FIG. 5 in the second reception mode. Similarly to that described above with reference to FIG. 5, a segment may be generated in operation S120' of FIG. 10, and data streams may be concatenated in operation S190' of FIG. 10. Operations S120' and S190' may be performed by the reception interface 40 of FIG. 4. Hereinafter, FIG. 10 will be described with reference also to FIGS. 4 and 5.

Referring to FIG. 10, operation S120' may include operations S121 and S122.

In operation S121, first segments may be generated. For example, the first tone demapper 42 may generate the first segments SG00 and SG01 from the first spatial stream SS0.

In operation S122, second segments may be generated. For example, the second tone demapper 43 may generate the second segments SG10 and SG11 from the second spatial stream SS1.

As described above with reference to FIGS. 6A, 6B, and 6C, each of the first segments SG00 and SG01 and the second segments SG10 and SG11 may have a 50-bit length.

In operation S190', a first segment and a second segment corresponding to a lower band may be concatenated. For example, the second concatenator 51 may concatenate the first segment SG00 (corresponding to the lower band among the first segments SG00 and SG01) and the second segment SG10 (corresponding to the lower band among the second segments SG10 and SG11). The second concatenator 51 may generate the second output OUT1 of 100 bits as described above with reference to FIGS. 6A, 6B, and 6C.

Figure 11:
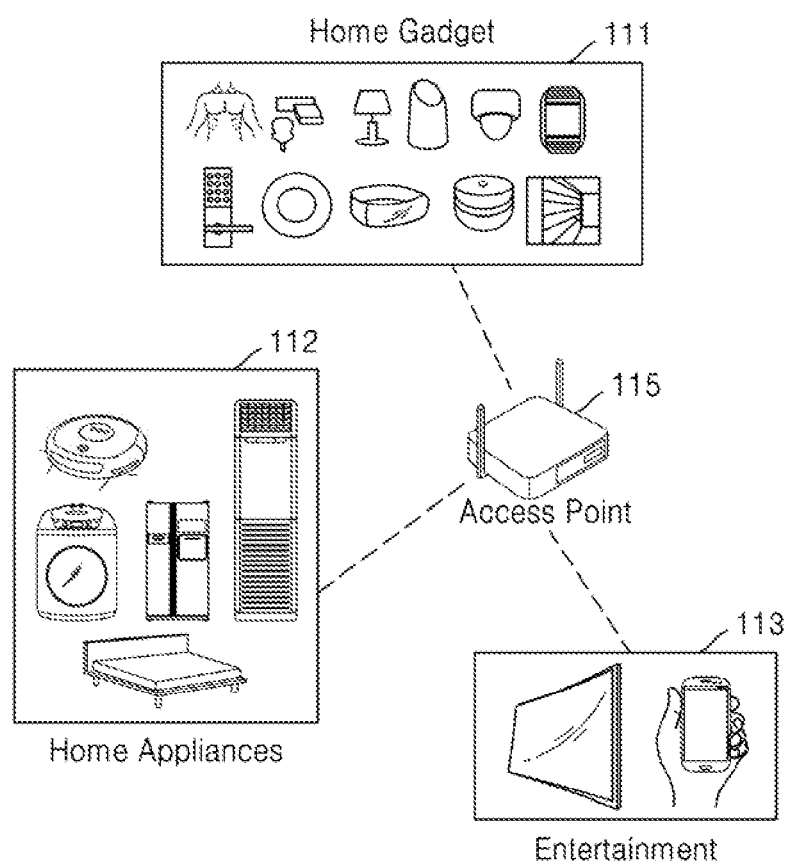
FIG. 11 illustrates devices for wireless communication, according to an example embodiment.

FIG. 11 illustrates devices for wireless communication, according to an example embodiment. Particularly, FIG. 11 shows an Internet of Things (IoT) network system including home gadgets 111, home appliances 112, entertainment devices 113, and an access point 115.

The devices for wireless communication in FIG. 11 may include resources reused in an extended bandwidth. For example, the home gadgets 111, the home appliances 112, the entertainment devices 113, and/or the access point 115 may include a stream deparser that is reused in the extended bandwidth, and accordingly, an additional stream deparser for the extended bandwidth may be omitted. Thus, the home gadgets 111, the home appliances 112, the entertainment devices 113, and/or the access point 115 may include processing circuitry having a reduced area and power consumption, and accordingly, may have high efficiency, thereby resulting in an increase in the efficiency of the IoT network system.

By way of summation and review, in 802.11ac, data may be simultaneously transmitted to a plurality of users by using a multi-user multi-input multi-output (MU-MIMO) scheme. In 802.11ax (referred to as high efficiency (HE)), multi-access is implemented by not only the MU-MIMO scheme but also providing an available subcarrier to users in a sharing manner based on orthogonal frequency division multiple access (OFDMA) technology. Through the multi-access, a WLAN system to which 802.11ax is applied may effectively support communication in a dense area and outdoors.

The protocol 802.11be (referred to as extremely high throughput (EHT)) implements support for an unlicensed frequency band of 6 GHz, use of a bandwidth of maximum 320 MHz per channel, support for hybrid automatic repeat and request (HARD), support for maximum 16×16 MIMO, and the like. Through 802.11be, a next-generation WLAN system is expected to effectively support low latency and ultra-high speed transmission like new radio (NR) that is fifth generation (5G) technology.

As described above, embodiments may provide an apparatus and a method for reusing resources to process signals received in an extended bandwidth.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. Processing circuitry configured to process a wireless signal received through at least one antenna, the processing circuitry comprising:
at least one segment deparser configured to generate a data stream from segments respectively corresponding to different frequency bands, the at least one segment deparser comprising a first segment deparser configured to generate a first data stream from first segments and a second segment deparser configured to generate a second data stream from second segments;
at least one rearranger configured to rearrange the data stream to generate a rearranged data stream, the at least one rearranger comprising a first rearranger configured to rearrange the first data stream to generate a rearranged first data stream and a second rearranger configured to rearrange the second data stream to generate a rearranged second data stream;
a first concatenator configured to generate a first input by concatenating a lower half of the rearranged first data stream and a lower half of the rearranged second data stream, and generate a second input by concatenating an upper half of the rearranged first data stream and an upper half of the rearranged second data stream;
a stream deparser configured to generate a bitstream based on one of the data stream and the rearranged data stream, the one of the data stream and the rearranged data stream being selected according to a reception mode of a plurality of reception modes, each of the plurality of reception modes being defined based on a bandwidth and multiple-input and multiple-output (MIMO) used for transmission of the wireless signal;
a codeword loader configured to generate codeword data from the bitstream; and
a decoder configured to decode the codeword data,
wherein the bitstream is generated based on the rearranged data stream in a first reception mode of the plurality of reception modes, and based on the data stream in a second reception mode of the plurality of reception modes.

2. The processing circuitry as claimed in claim 1, wherein the at least one rearranger is further configured to shift an upper half of valid bits of the data stream.

3. The processing circuitry as claimed in claim 1,
wherein the stream deparser is further configured to generate the bitstream from an output of the first concatenator in the first reception mode.

4. The processing circuitry as claimed in claim 3,
wherein the stream deparser is further configured to sequentially receive the first input and the second input in the first reception mode.

5. The processing circuitry as claimed in claim 3, wherein, in the first reception mode, the bandwidth is 160 MHz or 80 MHz+80 MHz, and the MIMO is enabled.

6. The processing circuitry as claimed in claim 1, further comprising:
a spatial demapper configured to generate spatial streams from receive chains; and
at least one tone demapper configured to generate the segments by reordering the spatial streams.

7. The processing circuitry as claimed in claim 6, wherein:
the at least one tone demapper includes:
a first tone demapper configured to generate the first segments associated with a first spatial stream; and
a second tone demapper configured to generate the second segments associated with a second spatial stream,
the processing circuitry further comprises a second concatenator configured to receive a first segment corresponding to a lower band among the first segments, receive a second segment corresponding to the lower band among the second segments, and concatenate the received first segment and the received second segment, and
the stream deparser is further configured to generate the bitstream from an output of the second concatenator in a second reception mode of the plurality of reception modes.

8. The processing circuitry as claimed in claim 7, wherein, in the second reception mode, the bandwidth is 20 MHz, 40 MHZ, or 80 MHz, and the MIMO is enabled.

9. The processing circuitry as claimed in claim 7,
wherein the stream deparser is further configured in a third reception mode of the plurality of reception modes to receive the first segment and provide the first segment to the codeword loader, and
in the third reception mode, the bandwidth is 20 MHz, 40 MHZ, or 80 MHz, and the MIMO is disabled.

10. The processing circuitry as claimed in claim 1, wherein:
the stream deparser is further configured to generate the bitstream based on the data stream in a fourth reception mode of the plurality of reception modes, and
in the fourth reception mode, the bandwidth is 160 MHz or 80 MHz+80 MHz, and the MIMO is disabled.

11. A method of processing a wireless signal received through at least one antenna, the method comprising:
generating, from receive chains, spatial streams;
generating segments by reordering the spatial streams, the segments include first segments corresponding to a first spatial stream of the spatial streams and second segments corresponding to a second spatial stream of the spatial streams;
concatenating a first segment corresponding to a lower band among the first segments and a second segment corresponding to the lower band among the second segments to produce concatenated segments;
generating at least one data stream from segments respectively corresponding to different frequency bands;
rearranging the at least one data stream as a rearranged data stream;
selecting one of the at least one data stream or the rearranged data stream according to a first reception mode of a plurality of reception modes, each of the plurality of reception modes being defined based on a bandwidth and multiple-input and multiple-output (MIMO) used for transmission of the wireless signal; and
generating a bitstream based on the one of the at least one data stream and the rearranged data stream;
generating codeword data from the bitstream; and
decoding the codeword data,
wherein the bitstream is generated based on the rearranged data stream in the first reception mode of the plurality of reception modes, and based on the data stream from the first segment and the second segment concatenated in a second reception mode of the plurality of reception modes.

12. The method as claimed in claim 11, wherein the rearranging of the at least one data stream includes shifting an upper half of valid bits of the at least one data stream.

13. The method as claimed in claim 11, wherein:
the generating of the at least one data stream includes:
generating a first data stream from first segments associated with a first spatial stream; and
generating a second data stream from second segments associated with a second spatial stream,
the rearranging of the at least one data stream includes:
rearranging the first data stream as a rearranged first data stream; and
rearranging the second data stream as a rearranged second data stream,
the method further comprises concatenating the rearranged first data stream and the rearranged second data stream to generate an output, and
the generating of the bitstream includes generating the bitstream from the output in the first reception mode.

14. The method as claimed in claim 13, wherein, in the first reception mode, the bandwidth is 160 MHz or 80 MHz+80 MHZ, and the MIMO is enabled.

15. The method as claimed in claim 11, wherein, in the second reception mode, the bandwidth is 20 MHz, 40 MHz, or 80 MHz, and the MIMO is enabled.

16. A communication device, comprising:
at least one antenna;
a transceiver connected to the at least one antenna; and
processing circuitry, wherein the processing circuitry is configured to:
generate at least one data stream associated with at least one spatial stream from a signal received through the at least one antenna and the transceiver,
rearrange the at least one data stream in a first reception mode,
generate a bitstream from the rearranged at least one data stream in the first reception mode,
generate the bitstream from the at least one data stream in a second reception mode different from the first reception mode,
generate codeword data from the bitstream; and
decode the codeword data.

17. The communication device as claimed in claim 16, wherein the processing circuitry is further configured to rearrange the at least one data stream by shifting an upper half of valid bits of the at least one data stream in the first reception mode.

* * * * *